Aug. 25, 1959 R. A. FISCHER ET AL 2,900,890
DUAL DIFFERENTIAL PRESSURE REGULATING CONTROL
Filed March 26, 1954
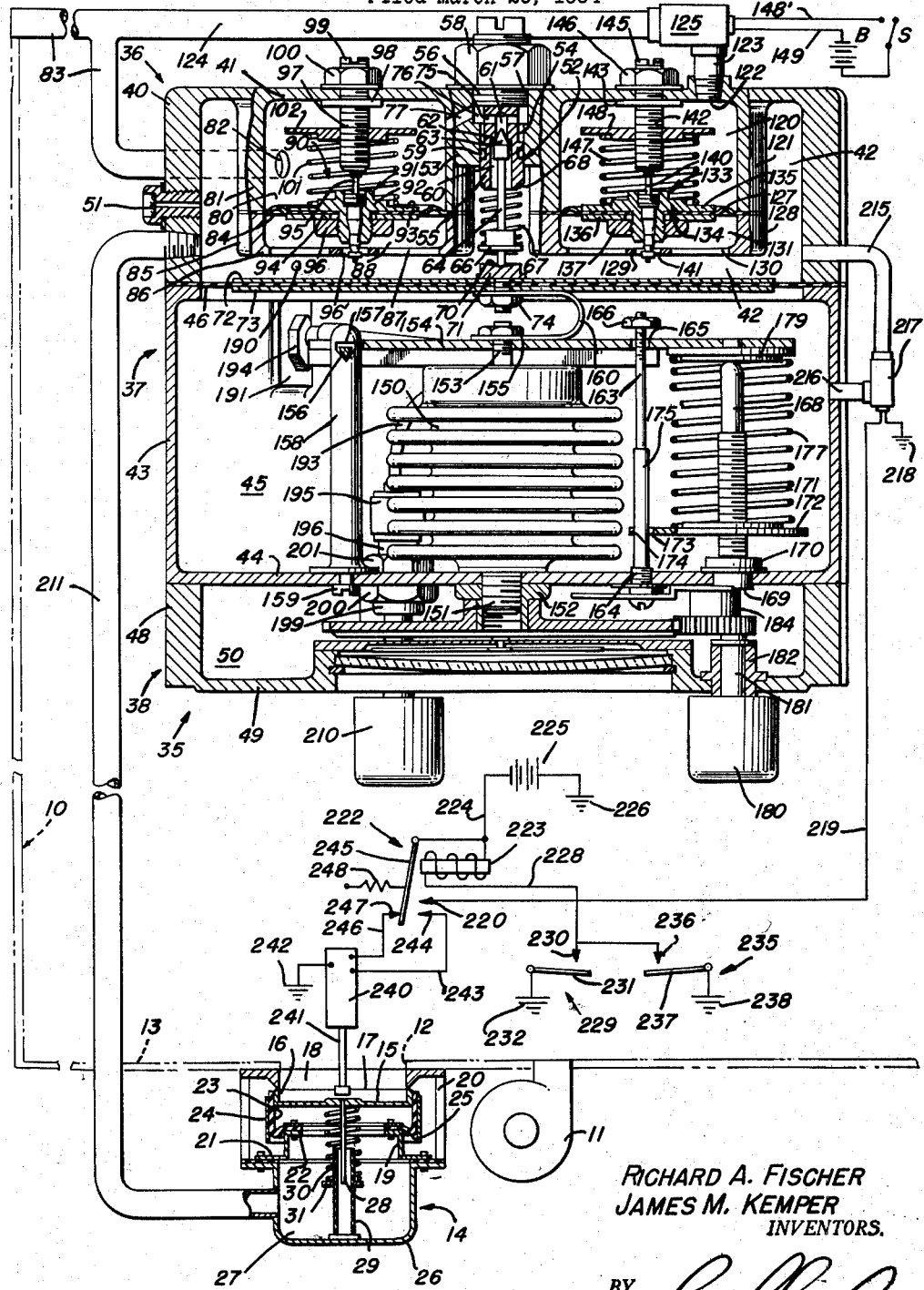
RICHARD A. FISCHER
JAMES M. KEMPER
INVENTORS.
BY 
ATTORNEY United States Patent Office 2,900,890
Patented Aug. 25, 1959

2,900,890
DUAL DIFFERENTIAL PRESSURE REGULATING CONTROL

Richard A. Fischer, Los Angeles, and James M. Kemper, Hollywood, Calif., assignors to The Garrett Corporation, Los Angeles, Calif., a corporation of California Application March 26, 1954, Serial No. 418,826

18 Claims. (Cl. 98—1.5)

This invention relates to apparatus for controlling the pressure within an enclosure, such as an aircraft cabin or the like, which is supplied with air under pressure by a pump, supercharger, ram, or the like.

The invention is particularly applicable to pressurizing military aircraft. Past experience has proven that with a high differential pressure in an aircraft cabin, the outrush of air when the enclosure wall or cabin wall is punctured, or a window is damaged due to shrapnel or an exploding shell, has been sufficient to eject the pilot or other occupants. This danger to occupants is considerably reduced by maintaining a lower differential pressure in the aircraft cabin when in combat.

In the present cabin pressure controller there are two differentials: a "combat" and a "cruise." The reason for having two differentials is so that the pilot may keep the cabin at maximum differential (which is maximum comfort) until he reached the "combat" region and at that time turn the regulator to "combat" or low differential. The cabin pressure will change to the new differential setting with no rate control other than that determined by the maximum flow which can pass through the outflow valves. No rate control is needed when going from high differential setting to low differential setting, first, because there is no detrimental effect on the eardrums with a decrease in pressure and secondly, because it is desirable to be able to depressurize rapidly when preparing for combat.

When the pilot is out of combat region and wishes to change back to maximum comfort differential, an adjustable rate of pressure change controller is available. Rate control here is provided because experience has shown that rapid increases in pressure has a detrimental effect on eardrums as well as being uncomfortable.

The present rate controller is also equipped with a cabin altitude selector by means of which the operator may select any altitude he desires from below sea level to the maximum altitude of the airplane. The same rate control that is used for controlling the rate of differential pressure change is operable when changing cabin pressure below the differential range. Below sea level calibration may be used for testing the pressurization system when the airplane is on the ground before takeoff.

Another object of the invention is to provide a pressure regulating system incorporating a differential changer, the operation of which may be initiated manually by the pilot or through electrical means, and which will then automatically change the differential from a predetermined high limit to a predetermined low limit, or vice versa, depending upon the direction in which the control is set for operation.

Still another object of the invention is to provide a system of this character wherein the changer mechanism includes a simple electrically operated valve, the electrical control means being manually controlled.

A further object of the invention is to provide a differential changing control which is adapted to override a control which normally operates to maintain a fixed (normal) differential between cabin and ambient pressure in at least one stage of operation of the regulating system. Thus the regulator would normally maintain a maximum differential in this stage of operation, but would be adapted, under manual control, to shift from high to low and back to high differential at the discretion of the crew, while operating under external atmospheric conditions normally calling for high differential.

A still further object of the present invention is to provide means for controlling the rate of pressure change within an aircraft cabin or enclosure so that discomfort or harm to the occupants of the aircraft will be avoided.

Another object of the invention is to provide a device of this character wherein cabin pressure will be maintained at substantially a constant value in an isobaric range of operation.

Still another object of the invention is to provide mechanism of this character which is pneumatic in operation.

Another object of the invention is to provide means for the prevention of sudden increases of cabin pressure when changing from ventilated to pressurized flight.

When the term "aircraft" is used herein, it is to be understood that it is intended to include any device which passes through the air.

Other objects and advantages of the invention will be brought out in the following part of the specification.

Referring to the drawing which is for illustrative purposes only, there is diagrammatically or schematically shown pressure control mechanism or apparatus embodying the present invention.

Referring more particularly to the drawings, there is shown an enclosure or cabin which is indicated generally at 10, supplied by air under pressure by a suitable pump or supercharger 11 operated by any suitable source of power, not shown, for maintaining a flow of air through the cabin, for purposes of ventilation. The cabin is provided with an outlet opening 12, in a wall 13 thereof, said outlet being controlled by an outflow valve, indicated generally at 14. The outflow valve 14 constitutes a means for regulating the pressure in the cabin to a value which corresponds to the pressure selected by the control point setting mechanism and is an example of one type of outflow valve which may be used in connection with the control mechanism which will be hereinafter described. Other types of outflow valves may be used, another example being that disclosed in the patent to Kemper, No. 2,463,491. Another type of outflow valve that may be used is that disclosed in the application of Richard A. Fischer for Pneumatic Valve, Serial No. 33,845, filed June 18, 1948.

The valve 14 will be but briefly described herein, inasmuch as a valve of this type is fully shown and described in the Arthur et al. Patent No. 2,531,100.

This valve comprises an outwardly opening balanced valve member 15 in the general shape of a shallow cup, said valve member having a peripheral flange 16 having a thin or narrow edge engageable with a seat 17 attached to the cabin wall and having an opening 18 which registers with the opening 12. An annular member 19, generally Z-shaped in cross section, is supported in spaced relation to the valve seat by means of spacers 20 through which bolts, not shown, pass.

The member 19 includes an outwardly extending annular flange 21 secured by the above referred-to bolts. The Z-shaped member 19 also includes an annular inturned flange 22 to which one end of a flexible diaphragm 23 is secured. The other end of the diaphragm is connected to the valve member 15 by means of an annular collar 24. The diaphragm includes a generally U-shaped portion 25 in the space between the member 19 and the collar 24, said U-shaped portion 25 rolling as the valve member 15 moves axially. A generally cup-shaped cover 26 is attached to the flange 21 and defines with the member 19, diaphragm 23 and valve member 15, a pressure chamber 27.

The valve 15 is adapted for axial movement and is provided with a stem 28 suitably mounted in a guide 29. A light spring 30, which reacts between the valve member 15 and a collar 31 on the guide 29, urges the valve member 15 in the closing direction.

Mechanism for setting the pressure in the chamber 27 is indicated generally at 35 and comprises a housing having three sections, indicated generally at 36, 37 and 38. The section 36 has side walls 40 and an outer end wall 41 defining a control pressure chamber 42. The mid-section 37 is provided with side walls 43 and an end wall 44, said walls defining a chamber 45 which, for convenience, will be termed "a back-up chamber." The chambers 45 and 42 are separated by a flexible diaphragm 46 marginally clamped between the adjacent ends of the walls 40 and 43 of the respective sections 36 and 37.

The section 38 also has side walls 48 and an end wall 49 defining a chamber 50.

The diaphragm 46 is a differential pressure responsive movable wall or element and is part of the pressure differential regulating mechanism for controlling the difference in pressure between chambers 42 and 45 when in the process of controlling rate of change.

Air is bled into the chamber 42 from a source of higher pressure (which may be the cabin interior as shown) through a restricted calibrated bleed 51 and escape of air to a region of lower pressure (which may be ambient atmosphere) is controlled by a valve, indicated generally at 52.

The valve 52 comprises a valve cage 53 having a bore 54 therein, for slidable reception of an adjustable valve seat 55 having an enlarged threaded portion 56 adjacent the outer end, said threaded portion 56 being threadably received in an enlarged bore 57 co-axial with the bore 54. The valve seat member 55 is held in adjusted positions by a lock nut 58 on the enlarged threaded portion 56 and an O ring or seal 59 is located in a groove in the valve seat member 55 for preventing the passage of air between the seat member 55 and the wall of the bore 54.

The valve seat member 55 has an axial bore 60 therein extending from the lower end, and is provided with a reduced diameter bore 61 above said bore 60 so as to form a shoulder or valve seat 62 cooperable with the conical seat engaging portion 63 of a movable valve member 64, the seat engaging head being of such character as to permit the flow of air past said valve when said valve is open.

The valve member 64 is provided adjacent its lower end with a spring retainer 66 for reception of one end of a spring 67, the opposite end of the spring 67 abutting against a shoulder 68 provided on the seat member 55, said spring 67 urging the valve member 64 away from the seat. The lower end of the valve member 64 is received in a conical recess 70 in the head 71 of a bolt which secures a pair of plates 72 and 73 on opposite sides of the diaphragm 46 to, thereby, reenforce the central area of said diaphragm, said bolt having a threaded portion on which is received a nut 74 for securing the parts together. Movement of the diaphragm in the upward direction will move the valve member 64 in the valve closing direction and movement of the diaphragm in the opposite direction will result in opening movement of the valve member by reasons of the action of spring 67.

When the valve member 64 is off the seat 62 air from the chamber 42 flows through the bores 60 and 61 through a cross bore 75 into an annular chamber 76 about the upper end of the seat member 55 and thence through a passage 77 in the valve cage 53. The passage 77 communicates with a chamber 80 defined by an annular wall 81 which extends from the end wall 41 of section 36. Chamber 80 has an outlet 82 which is adapted to be connected with ambient atmosphere by a conduit 83. The inner end of chamber 80 is closed by a flexible diaphragm 84 which is marginally clamped between the wall 81 and the adjacent end of a cap 85 in the shape of a shallow cup. The bottom wall 86 of the cap 85 is provided with openings 87 so that the interior 88 is provided with the same pressure as that in the chamber 42. The diaphragm 84 therefore is subjected on one side to control chamber pressure, the pressure in chamber 42, and on the opposite side to atmospheric pressure which prevails in the chamber 80.

The diaphragm 84 comprises an element of the high differential pressure responsive means, indicated generally at 90, and carries a valve indicated generally at 91. The valve 91 has a valve body 92 which extends through the diaphragm 84. The valve body 92 includes a flange portion 93 on one side of the diaphragm 84 and a central area of said diaphragm 84 is clamped between said flange 94 and a washer 94 on the opposite side of said diaphragm, the parts being secured together by a nut 96 threaded onto that portion of the valve body 92 which extends through the diaphragm. The valve 91 may be of any suitable type but is shown as being a "Schrader" which has a stem 95 within the chamber 80 and a part which extends outwardly of the body 92 and through an opening 96' in the wall 86 of the cap 85. Within the chamber 80 is a valve engaging stud 97 in axial alignment with the valve 91 and having its inner end disposed adjacent the free end of the valve stem 95. The stud 97 is provided with a flange 98 adjacent the outer end and said flange engages the inner side of the wall 41. The stud 97 is provided with screw threads and a threaded outer end portion 99 extends through the wall 41 for threadable reception of a nut 100 which secures the stud in position. A spring 101 reacts between the flange 93 of the valve body 92 and a spring retainer 102 threadably received on the stud 97, said spring 101 urging the valve 91 away from the stud 97 under certain operating conditions so that said valve will be closed. The spring 101 will, however, yield under a predetermined pressure differential across the diaphragm 84 so that the valve stem 95 will engage the adjacent end of the stud 97 and effect opening of the valve 91 so that air may pass from the chamber 42 into chamber 80 and thence escape to atmosphere through the outlet 82.

A second or low differential pressure control means for use in combat is provided and includes a chamber 120 defined by an annular wall 121 which extends from the end wall 41 of section 36. Chamber 120 has an outlet 122 which is adapted to be connected with a region of lower pressure, such as ambient atmosphere, by conduits 123 and 124 controlled by a solenoid valve 125 which is interposed between said conduits 123 and 124. It is to be noted that conduit 123 is connected with conduit 83 which leads to ambient atmosphere as has already been pointed out.

The inner end of chamber 120 is closed by a flexible diaphragm 127 which is marginally clamped between the free end of wall 121 and the adjacent end of a cap 128 in the shape of a shallow cup. The bottom wall 129 of the cap 128 is provided with openings 130 so that the interior 131 is provided with the same pressure as that in the chamber 42. The diaphragm 127, therefore, is subjected on one side to control chamber pressure, the pressure in chamber 42, and on the opposite side to pressure which prevails in the chamber 120.

The diaphragm 127 carries a valve indicated generally at 133 having a valve body 134 which extends through the diaphragm 127. The valve body 134 includes a flange portion 135 on one side of the diaphragm 127 and a central area of said diaphragm 127 is clamped between said flange 135 and a washer 136 on the opposite side of said diaphragm, the parts being secured together by a nut 137 threaded onto that portion of the valve body 134 which extends through the diaphragm. The valve 133 may be of any suitable type but is shown as being a "Schrader" which has a stem 140 within the chamber 120 and a part which extends outwardly of the body 134 and through an opening 141 in the wall 129 of the cap 128. Within the chamber 120 is a valve engaging stud 142 in axial alignment with the valve 133 and having its inner end disposed adjacent the free end of the valve stem 140. The stud 142 is provided with a flange 143 adjacent the outer end and said flange engages the inner side of the wall 41. The stud 142 is provided with screw threads and a threaded outer end portion 145 extends through the wall 41 for threadable reception of a nut 146 which secures the stud in position. A spring 147 reacts between the flange 135 of the valve body 134 and a spring retainer 148 threadably received on the stud 142, said spring 147 urging the valve 133 away from the stud 142 under certain operating conditions so that said valve will be closed. The spring 147 will, however, yield under a predetermined pressure differential across the diaphragm 127 so that the valve stem 140 will engage the adjacent end of the stud 142 and effect opening of the valve 133 so that air may pass from the chamber 42 into chamber 120 and thence, when solenoid 125 is open, escape to atmosphere through the outlet 122, conduit 123, and conduits 124 and 83.

The solenoid, not shown, of valve 125 is connected to a source of electrical energy, shown as a battery B, by means of an electrical circuit which includes wires 148 and 149, there being a switch S interposed in said electrical circuit for controlling same and thereby energizing the solenoid. The valve 125 is, in the present arrangement, closed when the solenoid thereof is deenergized although said valve could be arranged to be open under such conditions.

Within the chamber 45, and subjected to the absolute pressure thereof, is absolute pressure responsive means shown as comprising an evacuated bellows 150. One end of the bellows is provided with a threaded stud 151 which extends through the wall 44 and is secured by a nut 152. The opposite end of the bellows 150 is movable and is provided with a threaded projection 153 which extends through a lever 154, there being a nut 155 connecting the said movable end of the bellows 150 to the lever 154. The threaded projection 153 is disposed axially of the bellows 150 and also axially with respect to the bolt 71 and pilot valve member 64, the connection between the bellows 150 and the lever 154 being intermediate the ends of said lever.

One end of lever 154 is forked and between the side members of the forked end is a triangular pivot pin 156 received in an opening 157 provided therefor in the upper end of a support 158 secured to the wall 44 of the section 37 by any suitable means, shown as a screw 159. The lever 154 is connected with the diaphragm 46 by means of a suitable spring 160 having one arm secured beneath the nut 74 of the bolt 71 and the other arm secured beneath nut 155 of the threaded projection 153. Thus the absolute pressure responsive device 150 is connected to the pilot valve through a yielding connection.

Movement of the free end of lever 154 is limited in one direction by a stop comprising a nut 166 on the threaded free end of a bolt 163 having a threaded end 164 screwed into an opening provided therefor in wall 44. The bolt 163 has an end portion which extends through an opening 165 in the lever 154, the opening 165 being of larger diameter than the diameter of the bolt portion 163 received therein. The nut 166 is adapted to be engaged by the adjacent portion of the lever 154 for limiting upward movement of said lever. Movement of the free end of the lever in the opposite direction is limited by a stop bolt 168, said bolt having an enlarged portion 169 journaled in the wall 44 and there is a flange 170 on the inner side of wall 44 which limits longitudinal movement of the bolt 168 outwardly. The bolt 168 is provided with a threaded portion 171 on which is threadably mounted a spring retainer 172 having a radially extended portion 173 provided with a notch 174 in which is received an enlarged portion 175 of the bolt 163. The spring retainer 172 is adapted to move longitudinally on the adjustment bolt 168 and also is adapted to move longitudinally with respect to the bolt 163, the latter preventing rotation of said spring retainer on the bolt 168. A spring 177 has one end retained by the spring retainer 172, the opposite end of said spring being retained by spring retainer 179 secured to the free end portion of the lever 154 and rotation of the bolt 168 will effect variations in the loading of the spring 177. Downward movement of the free end of lever 154 is limited by engagement of the bottom surface of retainer 179 with the adjacent free end of the bolt 168. It will be noted that the spring 177 urges the free end of lever 154 in a direction urging expansion of the bellows 150.

Rotation of the bolt 168 to vary the loading of spring 177 is effected by means of a knob 180 having a shaft 181 journaled in a bearing 182 which is secured in an opening provided therefor in the wall 49 of section 38. The shaft 181 is provided with an extension 184 having a splined end, not shown, received in a splined socket in the adjacent end of bolt 168 so that rotation of knob 180 will effect corresponding rotation of the bolt 168.

Means for indicating the cabin pressure to be obtained is provided, this mechanism being disclosed in the Kemper et al. application for Pressure Regulating Mechanism, Serial No. 238,496, filed July 25, 1951, and it is believed to be unnecessary to further describe this mechanism in this application.

There is a bleed connection between the chambers 42 and 45, said connection opening into the chamber 42 at the orifice 190, there being a passage, not shown, from said orifice into a boss 191 on the inner side of the wall 43 of section 37. A tube 193 is connected to the passage in boss 191 by a fixture 194 of well-known character. The opposite end of the tube 193 has a fixture 195 which is connected to a valve 196. The valve has a portion 199 which extends through wall 44, said portion being secured by a nut 200 on said extension 199, the nut being threaded on said extension so that the wall 44 is clamped between said nut and a flange 201 on the opposite side of said wall. The valve is provided with a knob 210 which is secured to a metering pin which controls the flow of air between the chambers 42 and 45. Any suitable type of valve may be used and one type is disclosed in the above referred to Kemper et al. application Serial No. 238,496.

The control chamber 42 is connected to the chamber 27 of the outflow valve unit 14 by means of a conduit 211. Thus, the pressure in the chamber 27 will be substantially the same as the pressure in the control pressure chamber 42, said pressure being termed the control point setting pressure. It is to be understood, of course, that more than one outflow valve may be connected to the control point setting mechanism.

The mechanism is also provided with means for preventing sudden increases in cabin pressure during the transition from ventilated to pressurized flight. This means includes a connection between the chamber 42 and the chamber 45.

This connection includes the conduits 215 and 216 and the normally closed solenoid valve 217 which is interposed between said conduits. The valve 217 has a ground 218 and a connection 219 with a contact 220 of a relay switch, indicated generally at 222. The electric switch 222 includes a magnetic coil 223 having a connection 224 with a suitable source of electrical energy such as a battery 225 which is grounded at 226. The coil 223 has a connection 228 with a landing gear switch, indicated generally at 229. Switches of this type are known in the art and are operated in the usual manner by the landing gear mechanism when the weight of the airplane is on the landing gear. The switch 229 is shown as including a fixed contact 230 and a movable contact 231 having a ground 232. There is also shown a manually operable switch, indicated generally at 235 which includes a fixed contact 236 and a movable contact 237 which is grounded at 238. The closing of either switch 229 and 235 will effect energization of the coil 223. The relay switch 222 also controls the operation of an electric jack 240 which is adapted to open the outflow valve 14. The jack 240 includes a member 241 which is movable longitudinally and adapted to force open the valve member 15 of the outflow valve 14. The motor of the jack 240 is grounded at 242 and is provided with a pair of coils for effective operation in both directions. These coils are not shown but the coil for operating the motor to open the valve 14 has a connection 243 with a fixed contact 244 on the same side of a movable contact member 245 as the fixed contact 220. The coil for reversing the motor of the jack 240 has a connection 246 with a fixed contact 247 on the opposite side of said movable contact 245 and it is to be noted that the latter is urged in the clockwise direction and into engagement with a fixed contact 247 by a spring 248. The jack 240 is of a well-known type which includes limit switches limiting the movement of the member 241 in both directions. One type of such jack is disclosed in the Chapman Patent No. 2,407,537, issued September 10, 1946.

Operation of the mechanism

It will be understood, of course, that the pressure in the control chamber 42, which is transmitted to the chamber 27 of the valve 14, is used as a reference pressure, and this pressure plus the force of the spring 30 on the valve member 15 determines the pressure value at which the outflow valve 14 governs the cabin pressure. Hence, the outflow valve 14 controls cabin pressure and the mechanism 35 is a means for changing the operating point of outflow valve 14.

Assuming that the aircraft is on the ground, the ground condition of the mechanism is as follows: Chamber 42 is freely connected with ambient atmosphere through the pilot valve, passage 77, chamber 80, and connection 83 so that ambient atmospheric pressure exists in said chamber 42 and also in the chamber 27 of the outflow valve unit 14. Ambient atmospheric pressure also exists in the chamber 45 since it is connected to chamber 42 through the connection 190 and 193. Due to the pressure in chamber 45, the evacuated bellows 150 is completely compressed and, as a result, the free end of the lever 154 is urged into engagement with the free end of the bolt 168 which serves as a stop limiting clockwise movement, as shown in the drawing, of the lever 154. When the lever is in this position, the pilot valve member or pin assembly connected with the diaphragm 46, is in a wide open position.

In preparation for flight, the desired rate of change of pressure altitude is set by adjusting the rate selector knob 210 to fix the size of the orifice of the valve 196, and the pressure altitude of the terminal airport or the pressure altitude which it is desired to maintain in the cabin is set by adjusting the pressure altitude selector knob 180. Under these conditions, assuming that the pressure altitude selector is set for a terminal altitude higher than the starting altitude, the valve 52 will be open. When the airplane takes off and altitude is gained, ambient pressure transmitted through the open valve 52 will cause the pressure in chamber 42 to decrease. Should the rate set by the rate selector knob 210 be exceeded, the pressure in chamber 42 will drop below the pressure existing in chamber 45 and a pressure differential will be set up across the orifice of the valve 196, as well as across diaphragm 46. There will then be an interaction between the forces acting on the diaphragm 46 and the action of the spring 160 which will result in positioning the meter pin 63 so as to maintain a substantially constant differential across the diaphragm 46 and the orifice of the valve 196. Except for sudden surges, there is very little movement of the parts but there is a continual application of forces between them. The differential pressure between the chamber 42 and the chamber 45 will usually remain at a substantially constant level, for example, about .5" H₂O.

It will be understood that by thus continuing to maintain a substantially constant differential pressure across the orifice of the valve 196, the rate of change in pressure in the back-up chamber 45 is essentially determined (neglecting the density change) and, consequently, the rate of change in pressure in the control chamber 42 and the pressure in the pressure chamber 27 behind the sensing valve 15 of the cabin outflow valve unit 14 is also determined. By gradually changing the pressure in the pressure chamber 27, by means of the control point setting mechanism, the cabin pressure will be changed from one pressure altitude to another. The rate at which the cabin pressure will change from one value to another is determined by the setting of the rate valve 196. If laminar flow by means of a capillary is maintained between chambers 45 and 42 a rate of change in feet of altitude per minute will result instead of rate of change of pressure.

As the pressure in the chamber 45 falls, it will reach a value where the force in the bellows 150 is no longer able to balance the force which has been set into the spring 160. The right hand or free end of the lever 154 is thereupon moved counterclockwise to a position intermediate the stops 168 and 166, thereby relaxing the force of spring 160. At this time the pressure in the chambers 42 and 45 are substantially equal and the cabin pressure is maintained at the desired value.

Under the conditions of isobaric control an equilibrium condition exists wherein there is no differential of pressure between the pressures prevailing in the chambers 42 and 45 due to the balanced action of the isobaric bellows 150 and the isobaric spring 177 acting through the lever 154 and the spring 160 to reposition the valve 52 in response to any changes in the pressure in the chamber 42.

When a flight is to be made from a higher to a lower altitude, the altitude selector knob 180 is adjusted for the terminal atmospheric pressure and is moved in a direction to increase the force of spring 177 on the isobaric bellows 150, said bellows being expanded to a point whereat the free end of the lever 154 engages the stop 166, thereby limiting further expansion of said bellows. The action of the device is then the reverse from that described in connection with the flight from a low altitude to a higher altitude airport. If necessary, the rate selector valve is also adjusted by means of the knob 210 to provide the required rate of pressure change. The setting is such that the desired pressure change will occur over a predetermined period of time which is less than the time required for the flight between the starting point and the destination airport.

Should the circumstances be such that the differential between cabin pressure and ambient pressure reaches a predetermined value, the differential over-ride will become effective. Actually the differential over-ride 90 takes over when the differential of pressure between that in the control chamber 42 and ambient atmospheric pressure, which prevails in chamber 80, reaches the set predetermined value. At this time, the pressure in chamber 42, exerted on one side of the diaphragm 84, is sufficient to overcome the atmospheric pressure on the opposite side of the valve, plus the force of spring 101, to cause said diaphragm 84 to move inwardly of chamber 80. It is to be understood that when the differential control 90 is not effective, the free end of the valve body 92 is in engagement with the wall 86 which thereby limits outward movement of said diaphragm. When the diaphragm 84 is moved inwardly of the chamber 80, the valve pin 95 engages the adjacent end of the bolt 97 to effect opening of the Schrader valve so that air from the chamber 42 will escape into the chamber 80 and, thence, to atmosphere. As long as the aircraft is above the predetermined altitude above referred to, the differential pressure control device will control the pressure in the control chamber 42, and, thus, control the setting of the outflow valve 14 for controlling the pressure in the aircraft cabin. This differential pressure control mechanism provides a safety factor which prevents the cabin pressure from exceeding a predetermined value with respect to ambient pressure so that danger of rupturing of the cabin walls is thereby eliminated. When the differential over-ride takes control of the pressure in chamber 42, the isobaric bellows will have further expanded to close valve 52 and the constant cabin pressure control and the rate of change control will not be maintained. However, when the aircraft is above the said predetermined altitude and is descending, the rate control will then again come into operation and acting through diaphragm 46 and spring 160, modulate valve 52 to prevent the cabin pressure from increasing faster than the rate for which the mechanism is set.

The differential pressure responsive means 90 is adapted to maintain the normal or high differential pressure in chamber 42 while the other differential pressure control means, which includes the diaphragm 127 and valve 133, is adapted to maintain the pressure in the chamber 42 at a lower differential with respect to ambient atmospheric pressure when the solenoid valve 125 is open and is termed the low differential pressure responsive means. The solenoid valve 125 is normally closed but is adapted to be opened upon the closing of the cockpit switch S. When the aircraft is flying in the differential range and it is desired to provide a lower differential pressure than is normally provided by the high differential control, the cockpit switch is closed to open the solenoid valve 125 and provide communication between the chamber 120 of the low differential pressure control means and ambient atmosphere. The regulation of the pressure in the control chamber 42 is then taken over by the low differential control, the rate of change from high differential to low differential being dependent upon the change in control chamber pressure due to the flow of air through the valve 133 of the low differential pressure control means. The rate of change of air in the cabin is also dependent upon the flow of air into the cabin and the rate of discharge through the outflow valve 14.

The rate of change from the high to the low differential pressure is rapid and the decrease of pressure in the control chamber 42 during this change will effect a differential pressure across the diaphragm 46 which will retain the valve 52 in closed position.

When it is desired to change back to the high differential pressure, the cockpit switch S is opened so that the solenoid valve 125 will close and shut off communication between the chamber 120 of the low differential pressure control means and ambient atmosphere. During the transition from low to high differential the pressure in control chamber 42 will increase and create a differential of pressure across the diaphragm 46 causing spring 160 to yield so that the rate of change will be controlled by the valve 52. This rate of change will be in accordance with the rate of pressure change selected by the selecting means.

From the foregoing, it will be apparent that in the transition from high to low differential pressure, the rate of pressure change in chamber 42 is controlled by the rate at which the air may escape from chamber 42 through the valve 133 while the rate of change during the transition from low to high differential is controlled by valve 52 which, in turn, is under the control of the diaphragm 46. Further, it is to be understood that when changing from the high differential to low differential, the change is relatively rapid as is desirable when depressurizing for combat. However, when changing from the low differential to high differential control, the rate of pressure change is at a slower rate and will not exceed the preselected rate. This slower rate of change from the low to the high differential is important in preventing discomfort, and even injury, to the occupants of the aircraft. Means has been provided for establishing the proper reference pressure in the mechanism during ventilated flight, said means including the connection between the chambers 42 and 45 controlled by the valve 217. Under conditions of ventilated flight, the outflow valve 14 may be held open by the jack 240. This occurs when either the landing gear switch 229 or the manually operable switch 235 is closed and the relay switch 222 is actuated by the coil 223. Energization of the coil 223 effects counterclockwise movement of the switch member 245 which not only closes the circuit to the jack 240 for effecting movement to open the valve 14 but also effects opening of valve 217. When valve 217 is open, the pressure in chamber 45 is equalized with the pressure in chamber 42 causing valve 52 to either open or close depending on whether the cabin selector is set for higher or lower pressure than the pressure existing in chamber 42 when valve 217 is opened. Thus, when ventilated flight is required, the reference pressure for the rate control is immediately established at the existing value of the pressure in chamber 42 which is a pressure that will set the control point of the outflow valve 14 for the maintenance of the desired cabin pressure. When repressurization is initiated, the change in control point setting pressure (and also cabin pressure) to the value determined by either the isobaric or differential system occurs at the rate set on the rate selector. In this manner, sudden increases in cabin pressure are avoided when going from ventilated to pressurized flight.

We claim:

1. In pressure control mechanism: means defining a pair of pressure chambers having a restricted connection therebetween; means for controlling the pressure in one of said chambers including pilot valve means having a pressure responsive element responsive to variations in the differential of pressures in said chambers for controlling the flow of fluid relative to said one chamber, differential pressure responsive means having one side exposed to the pressure in one of said chambers and the opposite side subjected to external pressure and adapted to control the pressure in said one chamber in a differential range of operation, and a second differential pressure responsive means having one side exposed to the pressure in one of said chambers, and the opposite side exposed to said external pressure for controlling the pressure in said one chamber in another differential range of operation; bypass means interconnecting said chambers; and means for controlling said bypass means.

2. In pressure control mechanism: means defining a pair of pressure chambers having a restricted connection therebetween; means for controlling the pressure in one of said chambers including pilot valve means comprising a pressure responsive element responsive to variations in the differential of pressures in said chambers for controlling the flow of fluid relative to said one chamber, differential pressure responsive means responsive to variations in the differential of pressure between the pressure in said one chamber and external pressure, a second differential pressure responsive means responsive to variations in the differential of pressure between that in said one chamber and external pressure and having response characteristics different from that of the first mentioned differential pressure responsive means; a valve controlled passageway connecting said chambers together; and means for controlling said valve.

3. In pressure control mechanism: means defining a pair of pressure chambers having a restricted connection therebetween; means for controlling the pressure in one of said chambers including pilot valve means comprising a pressure responsive element responsive to variations in the differential of pressure in said chambers for controlling the flow of fluid relative to said one chamber, differential pressure responsive means responsive to variations in the differential of pressure between that in said one chamber and ambient atmosphere, a second differential pressure responsive means responsive to variations in the differential of pressure in said one chamber and ambient atmosphere and having response characteristics different from that of the first mentioned differential pressure responsive means; a valve controlled passageway connecting said chambers together; and electrical means for controlling said valve.

4. In pressure control mechanism for an enclosure: outflow valve means controlling the outflow of air from said enclosure; means defining a pair of pressure chambers having a restricted connection therebetween, one of said chambers being a control pressure chamber, said outflow valve being controlled by said control pressure; means for controlling the pressure in one of said chambers including pilot valve means having a pressure responsive element responsive to variations in the differential of pressure in said chambers for controlling the flow of fluid relative to said one chamber, a pair of differential pressure responsive means both of said differential pressure responsive means being subjected on one side to pressure in said control pressure chamber and on the opposite side to ambient atmospheric pressure, one of said differential pressure responsive means having response characteristics different from those of the other differential pressure responsive means; bypass means for interconnecting said chambers; means controlling said bypass means; means for effecting opening of said outflow valve; and means controlling the opening means for said outflow valve, said means also controlling the means for controlling said bypass means.

5. In pressure control mechanism for an enclosure: outflow valve means controlling the outflow of air from said enclosure; means defining a pair of pressure chambers having a restricted connection therebetween, one of said chambers being a control pressure chamber, said outflow valve being controlled by said control pressure; means for controlling the pressure in one of said chambers including pilot valve means having a pressure responsive element responsive to variations in the differential of pressure in said chambers for controlling the flow of fluid relative to said one chamber, a pair of differential pressure responsive means each having one side subjected to the pressure in the control pressure chamber and the opposite side subjected to external pressure, one of said differential pressure responsive means having response characteristics different from the other differential responsive means; bypass means for interconnecting said chambers; means controlling said bypass means; means for effecting opening of said outflow valve; and electrical means controlling the opening means for said outflow valve, said means also controlling the means for controlling said bypass means.

6. In pressure control mechanism for an enclosure: an outflow valve controlling flow of fluid from said enclosure; control means for said outflow valve comprising means defining a pair of pressure chambers having a restricted connection therebetween, means for controlling the pressure in one of said chambers by controlling the flow of fluid relative to said one chamber and including a pilot valve controlled by means including a pressure responsive element responsive to variations in the differential of pressures in said chambers, and differential pressure responsive means having one side exposed to pressure in one of said chambers and the other side exposed to a reference pressure; bypass means interconnecting said chambers; a second valve in said bypass means; and means for simultaneously opening said outflow valve and said second valve to equalize the pressure in said chambers.

7. In mechanism for controlling the pressure in enclosures: means defining a pair of pressure chambers having a restricted connection therebetween; and means for controlling the pressure in one of said chambers comprising, pilot valve means having a movable valve member, a pressure responsive element responsive to variations in the differential of pressures in said chambers for controlling said valve element, said valve element controlling the flow of fluid relative to said one chamber, pressure responsive means having one side exposed to pressure in said one chamber for controlling the pressure therein, a second pressure responsive means having one side exposed to the pressure in said one chamber for controlling the pressure therein, and pressure responsive means in the other chamber cooperable with the pressure responsive element for controlling said valve member.

8. Pressure control mechanism for an enclosure: means defining a pair of pressure chambers having a restricted connection therebetween; and means for controlling the pressure in one of said chambers comprising, pilot valve means having a movable valve member and a pressure responsive element responsive to variations in the differential of pressures in said chambers for controlling said valve element, said valve element controlling the flow of fluid relative to said one chamber, a pair of pressure responsive means each having one side exposed to pressure in one of said chambers for controlling the pressure in said one chamber, one of said pressure responsive means having different response characteristics than the other of said pressure responsive means, and another pressure responsive means in the other chamber for controlling the pressure in said one chamber.

9. The invention defined by claim 8 including means for selectively rendering operative one of said pair of pressure responsive means.

10. In pressure control mechanism for an enclosure: walls defining a control pressure chamber having an inlet passage and an outlet passage; means for controlling the pressure in said control chamber including a differential pressure sensitive element subjected on one side to pressure in said control chamber and adapted to control one of said passages; a restricted connection between the other side of said element and the control chamber, said connection including a relatively large capacity portion interposed therein; an absolute pressure responsive device subjected to the same pressure as said other side of said element and adapted to cooperate with said differential pressure responsive element in controlling said one passage; and means limiting the pressure in said control pressure chamber with respect to ambient atmosphere; and second means for limiting the pressure in said control pressure chamber at a different value with respect to ambient atmospheric pressure.

11. In pressure control mechanism for an enclosure: walls defining a control pressure chamber having an inlet passage and an outlet passage; means for controlling the pressure in said control chamber including a differential pressure sensitive element subjected on one side to pressure in said control chamber and adapted to control one of said passages; a restricted connection between the other side of said element and the control chamber, said connection including a relatively large capacity portion interposed therein; an absolute pressure responsive device subjected to the same pressure as said other side of said element and adapted to cooperate with said differential pressure sensitive element in controlling said one passage; and means limiting the pressure in said control pressure chamber with respect to ambient atmosphere; and second means for limiting the pressure in said control pressure chamber at a different value with respect to ambient atmospheric pressure, a second normally inoperative means for limiting the pressure in said control pressure chamber at a different value with respect to ambient atmospheric pressure; and means for rendering operative said second means for limiting the pressure in said control pressure chamber.

12. Pressure control mechanism for an aircraft cabin, comprising: outflow valve means having an outflow valve member; wall means defining a control pressure chamber having an inlet and an outlet, and a backup chamber; means connecting said control pressure chamber with said outflow valve for controlling the valve member thereof; a pilot valve, including a movable valve member, for controlling the outlet from said control chamber; passage means connecting said chambers together; adjustable means for variably restricting said passage means; a differential pressure responsive element for controlling said pilot valve member and responsive to variations in the differential of pressure between that in the control chamber and the back-up chamber; high differential pressure responsive means responsive to the differential of pressure between that in the control pressure chamber and ambient atmosphere for controlling the outflow of air from said control pressure chamber to maintain a high differential pressure in the control pressure chamber relative to ambient atmosphere; low differential pressure responsive means responsive to the differential of pressure between that in the control pressure chamber and ambient atmosphere for maintaining a lower differential pressure in the control pressure chamber relative to ambient atmosphere, said low differential pressure responsive means including a valve for controlling the outflow of air from said control pressure chamber; means for controlling said second differential pressure responsive means and normally rendering same inoperative, the valve of said low differential pressure control means controlling the rate of pressure change in the control pressure chamber during the transition from high to low differential control; an absolute pressure responsive device connected to said pilot valve and responsive to the absolute pressure in the backup chamber; means for limiting movement of said absolute pressure responsive device in both directions; a bypass passage connecting together the control pressure chamber and the backup chamber; an electrically controlled normally closed valve for controlling the bypass passage; an electrically operated jack for positively opening the outflow valve member; and means for controlling operation of said jack, said means also controlling the valve of said bypass passage and effecting opening of said bypass valve when said jack effects opening of said outflow valve member.

13. Pressure control mechanism for an aircraft cabin, comprising: outflow valve means having an outflow valve member; wall means defining a control pressure chamber having an inlet and an outlet, and a backup chamber; means connecting said control pressure chamber with said outflow valve for controlling the valve member thereof; a pilot valve, including a movable valve member, for controlling the outlet from said control chamber; passage means connecting said chambers together; adjustable means for variably restricting said passage means; a differential pressure responsive element for controlling said pilot valve member and responsive to variations in the differential of pressure between that in the control chamber and the backup chamber; high differential pressure responsive means responsive to the differential of pressure between that in the control pressure chamber and ambient atmosphere for controlling the outflow of air relative to said control pressure chamber; low differential pressure responsive means responsive to the differential of pressure between that in the control pressure chamber and ambient atmosphere and including a valve for controlling the outflow of air relative to said control pressure chamber; means for controlling said second differential pressure responsive means; an absolute pressure responsive device connected to said pilot valve and responsive to the absolute pressure in the backup chamber; means for limiting movement of said absolute pressure responsive device in both directions; a bypass passage connecting together the control pressure chamber and the backup chamber; an electrically controlled valve for controlling the bypass passage; an electrically operated jack for positively opening the outflow valve; and means for controlling the operation of said jack, said means also controlling the valve controlling said bypass passage.

14. Pressure control mechanism for an aircraft cabin, comprising: outflow valve means having an outflow valve member; wall means defining a control pressure chamber having an inlet and an outlet, and a backup chamber; means connecting said control pressure chamber with said outflow valve for controlling the valve member thereof; a pilot valve, including a movable valve member, for controlling the outlet from said control chamber; restricted means connecting said chambers together; a differential pressure responsive element for controlling said pilot valve member and responsive to variations in the differential of pressure between that in the control chamber and the backup chamber; high differential pressure control means including means responsive to the differential of pressure between that in the control pressure chamber and ambient atmosphere for controlling the flow of air relative to said control pressure chamber; low differential pressure control means including means responsive to the differential of pressure between that in the control pressure chamber and ambient atmosphere for controlling the flow of air relative to said control pressure chamber; means for controlling said low differential pressure control means; an absolute pressure responsive device connected to said pilot valve and responsive to the absolute pressure in the backup chamber; a bypass passage connecting the control pressure chamber and the backup chamber together; valve means for controlling the bypass passage; means for positively opening the outflow valve member; and means for controlling the operation of said means for positively opening the outflow valve member and also for controlling the valve means of said bypass passage.

15. Pressure control mechanism for an aircraft cabin, comprising: wall means defining a control pressure chamber and a backup chamber; a pilot valve, including a movable valve member, for controlling the flow of air relative to said control chamber; a restricted connection between said chambers; a differential pressure responsive element for controlling said pilot valve member and responsive to variations in the differential of pressure between that in the control chamber and the backup chamber; differential pressure responsive means responsive to the differential of pressure between that in the control pressure chamber and ambient atmosphere for controlling the flow of air relative to said control pressure chamber, said differential pressure responsive means controlling the pressure in said control chamber at a predetermined differential relative to ambient atmospheric pressure; a second differential pressure responsive means responsive to the differential of pressure between that in the control pressure chamber and ambient atmosphere for controlling the flow of fluid relative to said control pressure chamber to maintain therein a lower predetermined differential pressure relative to ambient atmosphere; means for controlling said second differential pressure responsive means; an absolute pressure responsive device connected to said pilot valve and responsive to the absolute pressure in the backup chamber; a bypass passage connecting the control pressure chamber and the backup chamber together; means controlling the bypass passage; and means controlling the bypass passage control means.

16. Pressure control mechanism for an aircraft cabin, comprising: wall means defining a control pressure chamber and a backup chamber; a pilot valve, including a movable valve member, for controlling the flow of air relative to said control chamber; passage means connecting said chambers together; a differential pressure responsive element for controlling said pilot valve member and responsive to variations in the differential of pressure between that in the control chamber and the backup chamber; high differential pressure control means responsive to the differential of pressure between that in the control pressure chamber and ambient atmosphere for controlling the flow of air relative to said control pressure chamber; low differential pressure control means responsive to the differential of pressure between that in the control pressure chamber and ambient atmosphere for controlling the flow of air relative to said control pressure chamber; means for controlling said low differential pressure responsive means and normally rendering same inoperative; an absolute pressure responsive device connected to said pilot valve and responsive to the absolute pressure in the backup chamber; a bypass passage connecting together the control pressure chamber and the backup chamber; means for controlling the bypass passage; and means for controlling said bypass passage control means.

17. Pressure control mechanism for an aircraft cabin, comprising: wall means defining a control pressure chamber and a backup chamber; a pilot valve, including a movable valve member, for controlling the flow of air relative to said control chamber; passage means connecting said chambers together; a differential pressure responsive element for controlling said pilot valve member and responsive to variations in the differential of pressure between that in the control chamber and the backup chamber; high differential pressure control means responsive to the differential of pressure between that in the control pressure chamber and ambient atmosphere for controlling the flow of air relative to said control pressure chamber; a normally inoperative low differential pressure control means responsive to the differential of pressure between that in the control pressure chamber and ambient atmosphere for controlling the flow of fluid relative to said control pressure chamber; means for rendering operative said low differential pressure responsive means; and an absolute pressure responsive device connected to said pilot valve and responsive to the absolute pressure in the backup chamber.

18. In a pressure control mechanism: means defining a pair of pressure chambers having a restricted connection therebetween; means for controlling the pressure in one of said chambers including pilot valve means having a pressure responsive element responsive to variations in the differential of pressures in said chambers for controlling the flow of fluid relative to said one chamber, differential pressure responsive means responsive to variations in the differential of pressure between that in one of said chambers and ambient atmosphere and having predetermined response characteristics, and a second differential pressure responsive means responsive to variations in the differential of pressure between that in one of said chambers and ambient atmosphere and having response characteristics different from the response characteristics of the first mentioned differential pressure responsive means; bypass means interconnecting said chambers; and means for controlling said bypass means.

References Cited in the file of this patent

UNITED STATES PATENTS

| | | |
|---|---|---|
| 2,463,487 | Widgery et al. | Mar. 1, 1949 |
| 2,463,492 | Arthur | Mar. 1, 1949 |
| 2,466,465 | Morris | Apr. 5, 1949 |
| 2,513,332 | Kemper | July 4, 1950 |
| 2,590,330 | Krueger | Mar. 25, 1952 |
| 2,610,564 | Cooper et al. | Sept. 16, 1952 |
| 2,669,175 | Fischer | Feb. 16, 1954 |
| 2,692,545 | Arthur et al. | Oct. 26, 1954 |
| 2,749,828 | Kemper et al. | June 12, 1956 |
| 2,767,637 | Maas | Oct. 23, 1956 |

UNITED STATES PATENT OFFICE
CERTIFICATE OF CORRECTION

Patent No. 2,900,890                                       August 25, 1959

Richard A. Fischer et al.

It is hereby certified that error appears in the printed specification of the above numbered patent requiring correction and that the said Letters Patent should read as corrected below.

Column 4, line 19, for "94", first occurrence, read -- 93 --; column 7, line 6, for "229 and 235" read -- 229 or 235 --.

Signed and sealed this 23rd day of February 1960.

(SEAL)
Attest:

KARL H. AXLINE                                               ROBERT C. WATSON
Attesting Officer                                        Commissioner of Patents